L. RENAULT.
VALVE GEAR FOR EXPLOSION MOTORS.
APPLICATION FILED JULY 10, 1911.
1,054,714.
Patented Mar. 4, 1913.
5 SHEETS—SHEET 5.
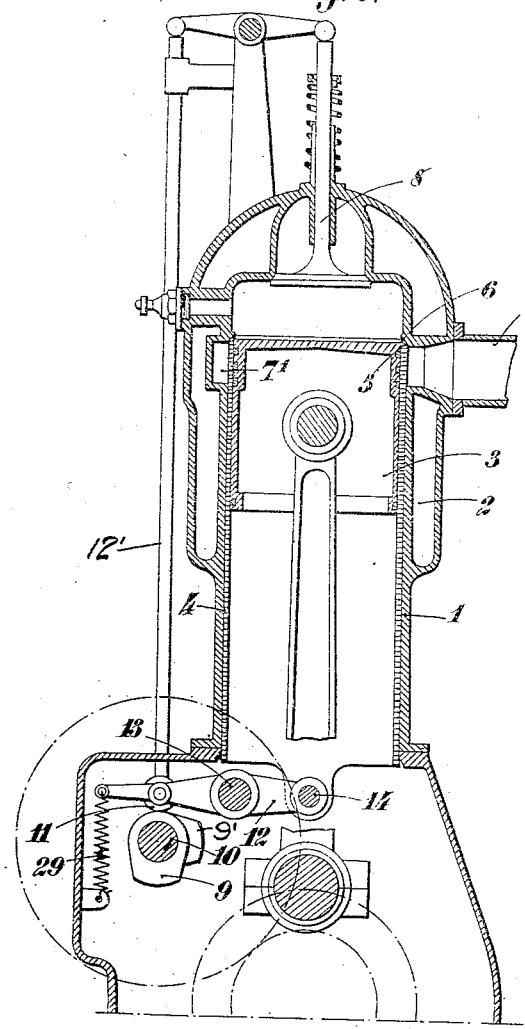
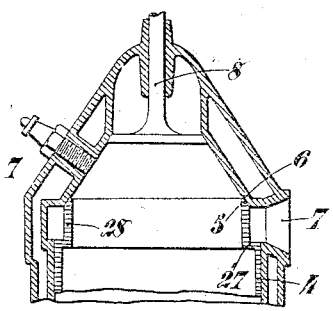
Witnesses.
Inventor.

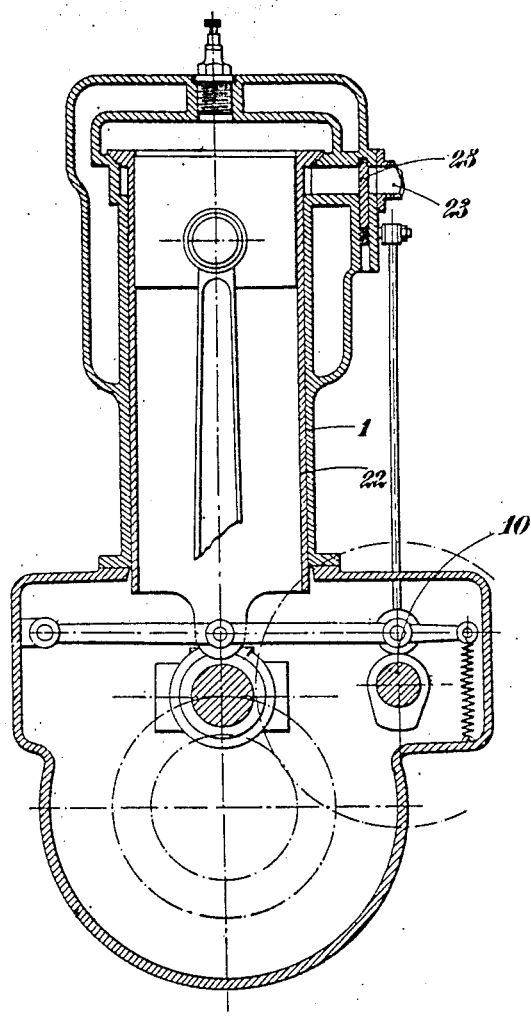

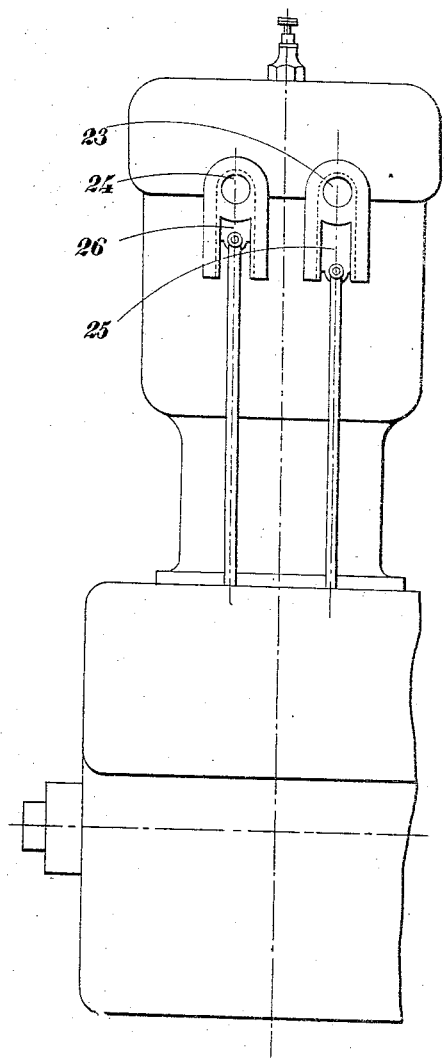

BEST AVAILABLE COP'

UNITED STATES PATENT OFFICE.

LOUIS RENAULT, OF BILLANCOURT, FRANCE.

VALVE-GEAR FOR EXPLOSION-MOTORS.

1,054,714.

Specification of Letters Patent. Patented Mar. 4, 1913.

Application filed July 10, 1911. Serial No. 637,754.

*To all whom it may concern:*

Be it known that I, LOUIS RENAULT, engineer, citizen of the French Republic, residing at Billancourt, Department of the Seine, France, have invented certain new and useful Improvements in Valve-Gear for Explosion-Motors, of which the following is a specification.

The invention has for its object a distributing gear for explosion motors and particularly for automobile or aeroplane motors in which the result aimed at is particularly to obtain an exceedingly rapid opening of the inlet and of the exhaust and a large passage for the gases while at the same time the distributing members effect movements of relatively small amplitude.

The invention consists in arranging around the piston between its outer wall and the inner wall of the cylinder a cylindrical slide valve which may or may not embrace the entire circumference of the cylinder and which is provided at its upper part with a flange forming a valve. This valve which is of very large size rests upon a seat which is constituted by the upper part of the cylinder itself. Owing to the large diameter given to the slide valve this device permits of obtaining a very large passage for the gases with a relatively small lift of the slide valve, while at the same time the arrangement entails no increase in the dimensions of the cylinder.

Figure 1:
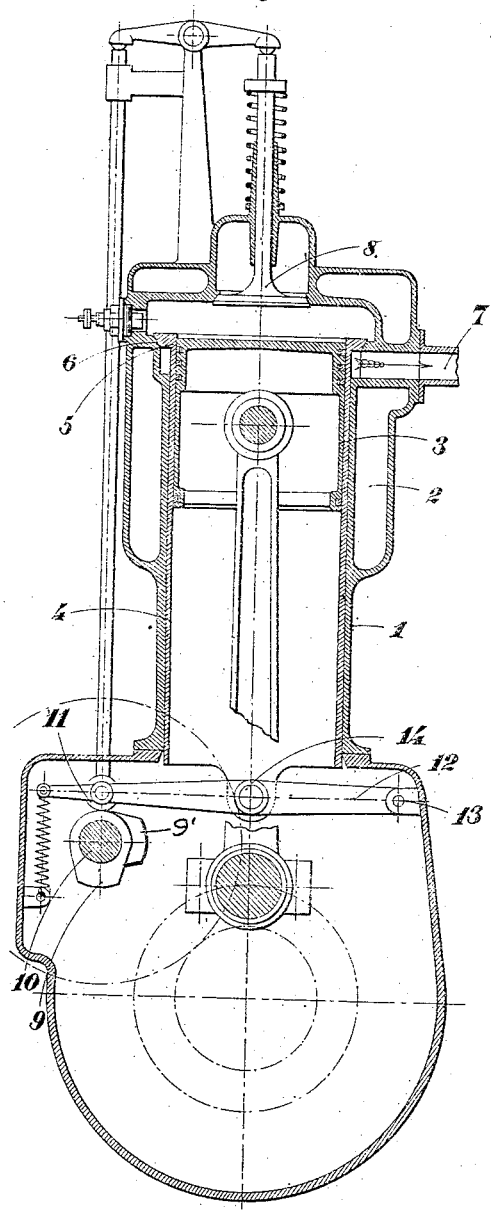
Figure 2:
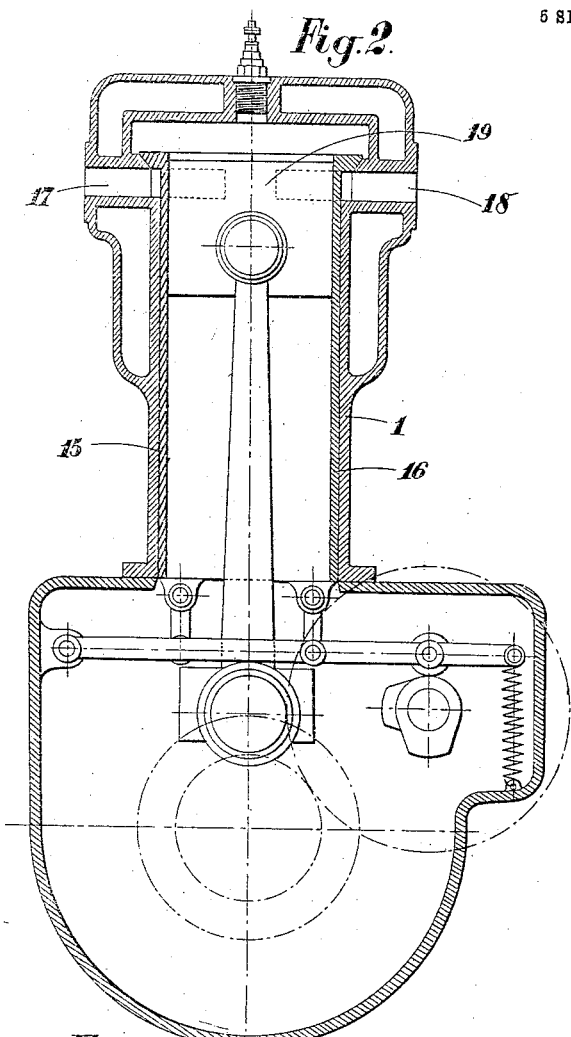
Figure 3:
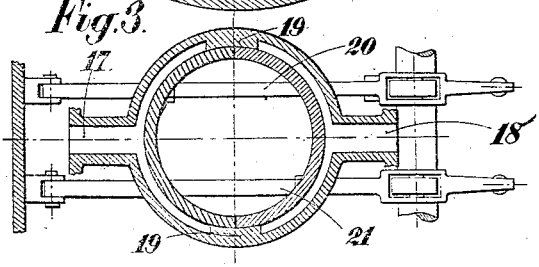

Various constructional forms of the device which form the object of the invention are illustrated by way of example in the accompanying drawing in which:

Figure 1 is a vertical section of a motor in which the exhaust valve only is arranged in accordance with the invention. Figs. 2 and 3 are respectively a vertical section and a plan of a motor in which the admission and the exhaust are both controlled by slide valves embodying the invention. Figs. 4 and 5 illustrate in section and in elevation at right angles to that of the section another form of the motor in which the same slide valve serves for the admission and for the exhaust in succession. Figs. 6 and 7 illustrate two modifications in the construction of the slide-valve.

In Fig. 1, 1 designates the cylinder and 2 its water jacket. Between the cylinder 1 and the piston 3 the slide valve 4 is arranged, its upper part 5 resting on the seat 6 formed in the cylinder. In this figure, the slide valve 4 serves for the exhaust. The gases expelled after the explosion escape to the exterior through the conduit 7 either directly into the atmosphere or into an exhaust collector and thence into a silencer. The inlet valve 8 is arranged at the upper part of the cylinder above the piston and it may also be made of large size. The slide valve is operated in any convenient manner for example as represented in Fig. 1 by means of a cam 9 mounted on the cam shaft 10 and acting upon a roller 11 mounted at the extremity of the lever 12 pivoted around a fixed point 13 and also pivoted at 14 to the inner part of the slide valve. The inlet valve is controlled for example by means of a rocker, a lift rod 12' and a second cam 9" on shaft 10 such as is ordinarily employed in certain automobile and aeroplane motors.

In the arrangement illustrated in Figs. 2 and 3 the single slide valve is replaced by two slide valves each presenting a semi-circle in cross section and represented at 15 and 16. One of these slide valves serves for the admission and the other for the exhaust; the corresponding conduits 17 and 18 are shut off by partitions 19 cast with the cylinder. The two slide valves 15 and 16 are controlled by any appropriate means; for example by a double system of levers analogous to that shown in Fig. 1 and which is shown in plan at 20 and 21. Obviously the two slide valves 15 and 16 might be made less than a semi-circle in extent provided that the circumference is completed by a fixed part cast with the cylinder.

In the arrangement illustrated in Figs. 4, 5, the same slide valve 22 serves in succession for the admission and for the exhaust. With this object two conduits 23 and 24 are provided, one serving for the admission of the gases and the other for their exhaust and which are controlled by valves 25 and 26 respectively. These valves are controlled by the cam shaft 10 by any appropriate means in such a manner that their movements in conjunction with the movement of the slide valve 22 which is also controlled by the cam shaft produce in succession the various phases of the cycle of the motor in question. It should be noted that the plane slides or valves 25 and 26 invariably experience substantially the same pressure on both their faces; this facilitates the construction, the guidance and the lubrication.

In the foregoing arrangements the exhaust slide valve has been represented as resting normally upon a seat formed in the cylinder the opening movement taking place by lifting the slide valve above its seat. In the devices illustrated in Figs. 6 and 7, the arrangement is inverted. The slide valve rests beneath its seat and the opening movement takes place by depressing said valve. The cylinder 1 surrounded by a cooling jacket 2 is cast with the cylinder head. A suction valve 8 of large diameter operated by any convenient means for example by means of a rocker is arranged at the upper part of the cylinder head. A cylindrical slide valve 4 is mounted inside the cylinder 1 between this cylinder and the piston 3, the upper edge 5 of this slide valve being chamfered and converging in an upward direction. This slide valve 4 rests upon a seat 6 presenting a chamfered surface directly in the same manner and which is machined inside the cylinder. An exhaust socket 7 communicates with an annular space $7^1$ surrounding the slide valve at its upper part. The slide valve 4 is operated by any convenient means for example by means of a lever 12 pivoting at a fixed point 13; one end of this lever is pivoted to the slide valve 4 while its other extremity is connected with a spring 29 fixed to the gear case. A cam 9 carried by a shaft 10 controls the lever of the valve 4 by the intermediary of a roller 11 mounted on the lever 12. Admission valve 8 is operated by means similar to those employed in the modification shown in Fig. 1.

In Fig. 7 a modified construction is shown in which the slide valve presents a restriction 28 connected with the main portion 4 by means of an annular horizontal shoulder 27. As in the preceding example the upper part of the restriction 28 presents a conical chamfer converging upward applied to a seat of the same form machined in the cylinder of the motor. The operation of the two devices described above is characterized mainly by the instantaneous and direct discharge of the gases toward the exhaust socket 7 which they are able to reach without having to effect any detour immediately after the distributing gear has moved the slide valve from its seat. The slide valve 4 is firmly held to its seat either by means of the spring 29 in the case illustrated in Fig. 6, or in the case illustrated in Fig. 7 by the pressure prevailing inside the cylinder and which is exerted vigorously upon the annular shoulder 27 of the slide valve.

The advantages obtained by the construction shown in Figs. 6 and 7 are as follows: The construction is facilitated. In the arrangements shown in Figs. 1, 2, 3, 4, 5, it is necessary to employ detachable cylinder heads to enable the slide valve to be arranged in place. In the improved arrangement as in Figs. 6 and 7 on the contrary, the cylinder and the cylinder head can be formed in one piece, the slide valve being arranged in place through the lower part of the cylinder. Furthermore the improved arrangement enables the gases to escape directly and instantaneously without effecting any detour at the moment of the exhaust period, thereby avoiding any resistance to the passage of the gases and consequently obtaining greater efficiency. In practice the exhaust is instantaneous. As shown in the drawing, the improved arrangement also permits of giving to the slide valve such a form that it is naturally applied to its seat by the pressure obtained inside the cylinder. The value of the force holding the valve to its seat is variable in accordance with the difference between the diameter of the body of the slide valve and the diameter of its seat; it can be reduced to zero as shown in Fig. 6. It will be understood that the operating means may vary as desired as stated in the first part of the application. Finally, the improvement is also applicable to the case of double slide valves extending over a portion of the circumference of the cylinder, one of them serving for the admission and the other for the exhaust as shown in Figs. 2 and 3.

The device illustrated in Figs. 6 and 7 is applicable to cases in which a single slide valve serves for the admission and for the exhaust according as communication is established with the inlet or exhaust by means of auxiliary slide valves when the principal slide valve is separated from its seat as shown in Fig. 5.

I claim:

1. An explosion motor, comprising a cylinder, a piston, admission and exhaust ports in said cylinder, a valve interposed between the piston and the cylinder and provided with a seating rim, a valve seat in the cylinder coöperating with said seating rim on the valve to control the exhaust port, and means for actuating said valve.

2. An explosion motor, comprising a cylinder, a piston, admission and exhaust ports in said cylinder, a valve interposed between the piston and the cylinder and provided with a beveled seating rim thereon, a beveled valve seat in the cylinder coöperating with said beveled seating rim on the valve to control the exhaust port, and means for operating the said valve.

3. An explosion motor, comprising a cylinder having an explosion chamber, and inlet and outlet ports in the walls thereof, a piston in the cylinder, a valve interposed between the piston and the cylinder, a second valve interposed between the piston and the cylinder, a beveled seat formed on the interior of the cylinder, said valves having beveled seating rims to coöperate with said beveled seat to control the admission and exhaust ports, and means for actuating said valves.

In testimony whereof I have hereunto set my hand in presence of two subscribing witnesses.

LOUIS RENAULT.

Witnesses:
 DEAN B. MASON,
 LOUIS JOSSE.

Copies of this patent may be obtained for five cents each, by addressing the "Commissioner of Patents, Washington, D. C."